(12) United States Patent
Jayasuriya et al.

(10) Patent No.: US 7,374,239 B1
(45) Date of Patent: May 20, 2008

(54) ACTIVE HEAD RESTRAINT WITH SELF RESETTING MECHANISM

(75) Inventors: A. Mangala M. Jayasuriya, Bloomfield Hills, MI (US); James Adams, New Boston, MI (US); Michael Russick, Dearborn Heights, MI (US); Mark Lippman, New Baltimore, MI (US); Zbigniew Orzelski, Bloomfield Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 11/654,260

(22) Filed: Jan. 16, 2007

(51) Int. Cl.
*B60N 2/42* (2006.01)
(52) U.S. Cl. ............................... 297/216.12
(58) Field of Classification Search ......... 297/216.12, 297/216.13, 216.14
See application file for complete search history.

(56) References Cited

U.S. PATENT DOCUMENTS

| 6,019,424 | A | 2/2000 | Ruckert et al. | |
| 6,135,561 | A * | 10/2000 | Kruger et al. | 297/408 |
| 6,568,753 | B1 | 5/2003 | Watanabe | |
| 6,607,242 | B2 * | 8/2003 | Estrada et al. | 297/216.12 |
| 6,715,829 | B2 * | 4/2004 | Svantesson et al. | 297/216.12 |
| 6,779,840 | B1 | 8/2004 | Farquhar et al. | |
| 6,840,560 | B2 | 1/2005 | Flogard | |
| 7,097,242 | B2 * | 8/2006 | Farquhar et al. | 297/216.12 |
| 2005/0077762 | A1 * | 4/2005 | Kraemer et al. | 297/216.12 |
| 2005/0127726 | A1 * | 6/2005 | Schilling et al. | 297/216.12 |
| 2006/0071518 | A1 * | 4/2006 | Hippel et al. | 297/216.12 |
| 2006/0267384 | A1 * | 11/2006 | Fischer et al. | 297/216.12 |

* cited by examiner

*Primary Examiner*—Peter R. Brown
(74) *Attorney, Agent, or Firm*—Franklin A. MacKenzie (57) ABSTRACT

An apparatus includes a seat back having an outer surface that selectively contacts a seat occupant and a head restraint extending from the seat back that has a head restraint portion that selectively contacts the seat occupant. The head restraint portion is moveable between a forward position and a rearward position. The apparatus also includes a head restraint control assembly having an actuator, a lock mechanism, and a lock mechanism resetting device. The actuator transfers an actuation force to the head restraint portion for initiating movement of the head restraint portion from the rearward position to the forward position. The lock mechanism selectively restrains the headrest portion from moving from the forward position to the rearward position. The lock mechanism will restrain the headrest portion from moving from the forward position to the rearward position in a first actuation event and selectively reset by action of the lock mechanism resetting device in order to restrain the headrest portion from moving from the forward position to the rearward position in a second actuation event. The lock mechanism resetting device will reset the lock mechanism without manipulation from an outside source.

16 Claims, 7 Drawing Sheets

ACTIVE HEAD RESTRAINT WITH SELF RESETTING MECHANISM

TECHNICAL FIELD

The disclosure generally relates to head restraint assemblies in vehicles.

BACKGROUND

A vehicle typically includes a head restraint for each seat. These head restraints generally extend vertically from the seat back and may prevent neck hyperextension. Typical sensor actuated head restraints may have mechanisms for moving the head restraint forward during a crash that include a source of stored energy and a trigger. The source of stored energy may be a compressed spring or source of pyrotechnic (chemical) or electrical energy that is used to move the headrest to a desired position. The trigger may be a latch or electrical activation device that initiates the movement of the headrest. However, these systems rely on complexity and may provide additional failure modes for the systems.

Some head restraints are intended to move forward during a crash, but may return to a rearward position when a delay in remaining in the forward position could be desirable. What is needed, therefore, is a control system for a head restraint control system that may delay the return of a head restraint to the rearward position.

SUMMARY

An illustrative embodiment includes a seat back having an outer surface that selectively contacts a seat occupant and a head restraint extending from the seat back that has a head restraint portion that selectively contacts the seat occupant. The head restraint portion is moveable between a forward position and a rearward position. The apparatus also includes a head restraint control assembly having an actuator, a lock mechanism, and a lock mechanism resetting device. The actuator transfers an actuation force to the head restraint portion for initiating movement of the head restraint portion from the rearward position to the forward position. The lock mechanism selectively restrains the headrest portion from moving from the forward position to the rearward position. The lock mechanism will restrain the headrest portion from moving from the forward position to the rearward position in a first actuation event and selectively reset by action of the lock mechanism resetting device in order to restrain the headrest portion from moving from the forward position to the rearward position in a second actuation event. The lock mechanism resetting device will reset the lock mechanism without manipulation from an outside source.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
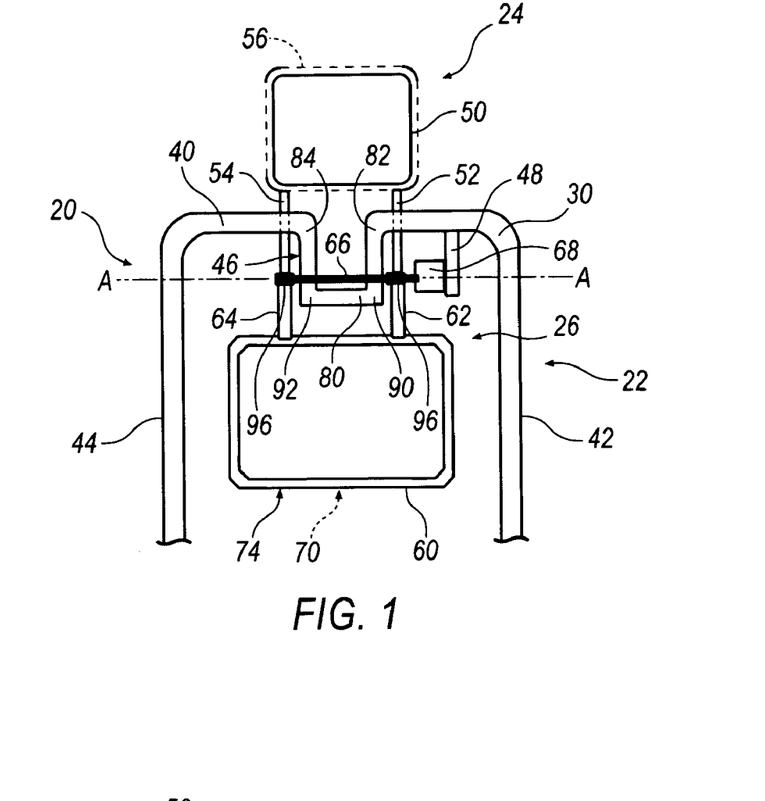
FIG. 1 is a front view of a portion of an active head restraint system according to an embodiment.
Figure 2:
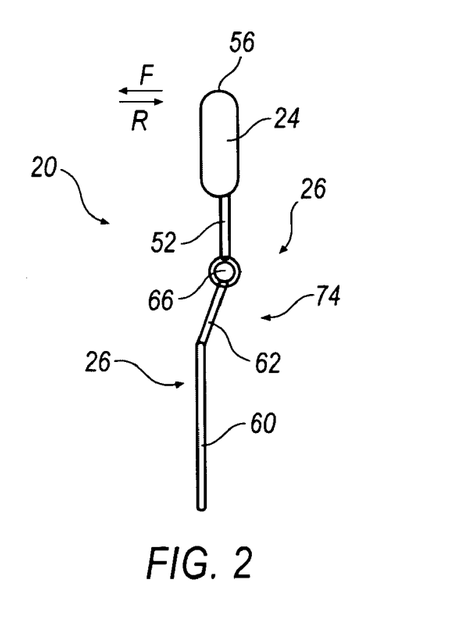
FIG. 2 is a side view of a portion of the system of FIG. 1, illustrated in a first configuration.
Figure 3:
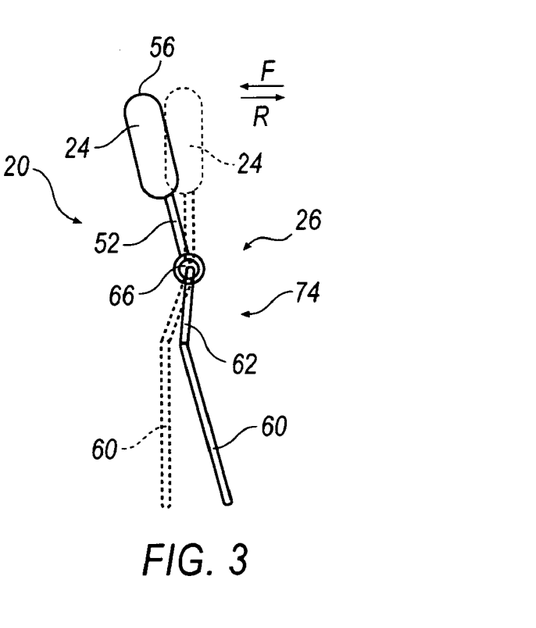
FIG. 3 is a side view of a portion of the system of FIG. 1, illustrated in a second configuration, with the illustration of FIG. 2 overlaid in phantom for comparison.

FIGS. 1-3 illustrate an active head restraint system 20. System 20 includes a seat back 22, a head restraint 24, and a head restraint control system 216. The seat back 22 includes a seat back frame 30 attached to a seat bottom (not shown), and a seat back outer covering (not shown). The seat back frame 30 includes horizontal member 40, a first vertical member 42, a second vertical member 44, a head restraint attachment portion 46, and a deceleration device attachment portion 48. The head restraint 24 includes a structural portion 50, a first link 52, a second link 54, and a head restraint outer covering 56.

The head restraint control system 26 includes a thorax member, or thorax back plate, 60, a first plate link 62, a second plate link 64, an interconnecting member 66 having an axis A-A, a rotary damper, or deceleration device 68, and a latch, or lock mechanism 70. In the embodiment illustrated, the head restraint control system 26 is positioned within the seat back outer covering of the seat back 22. As best seen in FIG. 1, the first plate link 62 is attached to the first vertical member 42, and the second plate link 64 is attached to the second vertical member 44 to form a head restraint assembly 74 that includes the head restraint 24 the thorax plate 60, structural portion 50, first link 52, second link 54, first plate link 62, second plate link 64, and interconnecting member 66.

As best seen in FIGS. 2 and 3, the interconnecting member 66 is rotatably attached to the seat back frame 30 at about the axis A-A. Specifically, the horizontal member 40 of the seat back frame 30 includes a horizontal attachment member 80, a first vertical attachment member 82, and a second vertical attachment member 84. As illustrated, the horizontal attachment member 80 includes a first end 90 and a second end 92 and is positioned below the remainder of the horizontal member 40. The first vertical attachment member 82 extends between the first end 90 and horizontal member 40. The second vertical attachment member 84 extends between the second end 92 and the horizontal member 40. Both the first vertical attachment member 82 and the second vertical attachment member 84 include a pivotal attachment 96 formed therein. In the embodiment illustrated, the interconnecting member 66 is a cylindrical rod that is interposed through the pivotal attachments 96 for relative rotation therebetween about the axis A-A. The interconnecting member 66 is a torsion rod that biasingly urges the head restraint assembly 74 toward the rearward position, although other springs or biasing means may be interconnected between the head restraint assembly 74 and the seat back frame 30 for the same purpose.

Therefore, the head restraint assembly 74 is rotatable generally about the axis of the interconnecting member 66 from a first configuration, or rearward position, of FIG. 2 to a second configuration, or forward position, of FIG. 3. When a seat occupant is properly positioned within the seat bottom and the seat back 22, the seat occupant's head may be horizontally positioned relative to the head restraint 24, and the seat occupant's thorax may be horizontally positioned relative to the thorax plate 60. In another potential embodiment not illustrated, the rotational axis A-A may be moved forward (in the direction of the arrow F) while other components remain in about the same position to permit the head restraint 24 to move upward as the head restraint rotates forward, as desired.

The rotary damper 68 may provide some resistance to rotation of the head restraint assembly 74 toward the forward position, and will provide significantly greater resistance to rotation of the head restraint assembly 74 toward the rearward position. In this manner, the rotary damper 68 may provide some amount of time delay for the head restraint assembly 74 to return to the rearward position (first configuration) and may reduce the initial jolt imparted to the lock mechanism 70 as the lock mechanism 70 engages to retain the head restraint assembly 74 in about the forward position.

Figure 4:
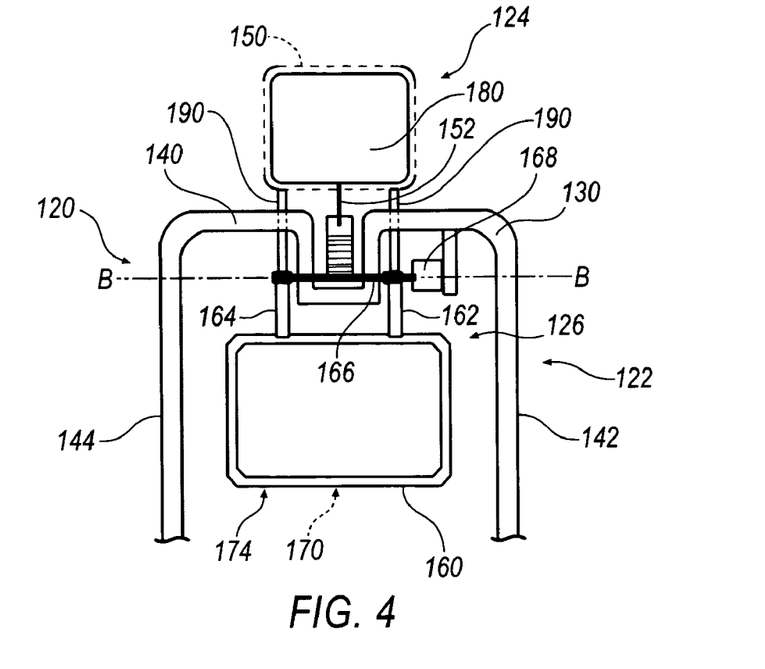
FIG. 4 is a front view of a portion of a head restraint system according to another embodiment.
Figure 5:
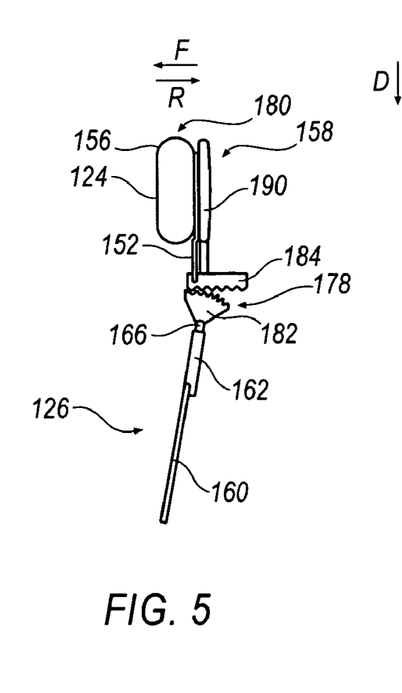
FIG. 5 is a side view of a portion of the system of FIG. 4, illustrated in a first configuration.
Figure 6:
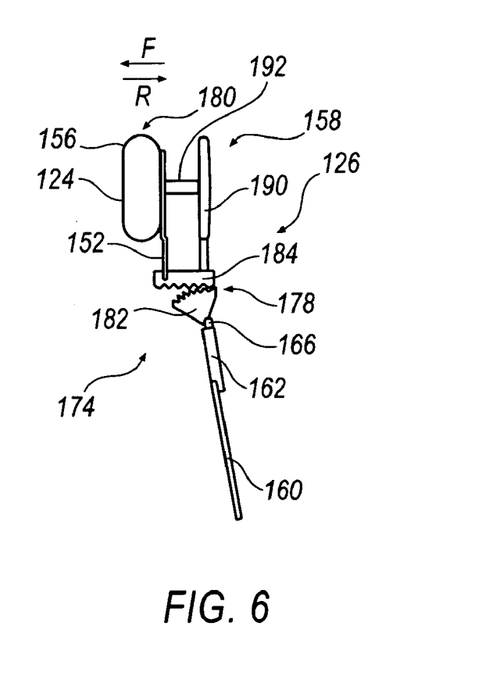
FIG. 6 is a side view of a portion of the system of FIG. 4, illustrated in a second configuration.
Figure 7:
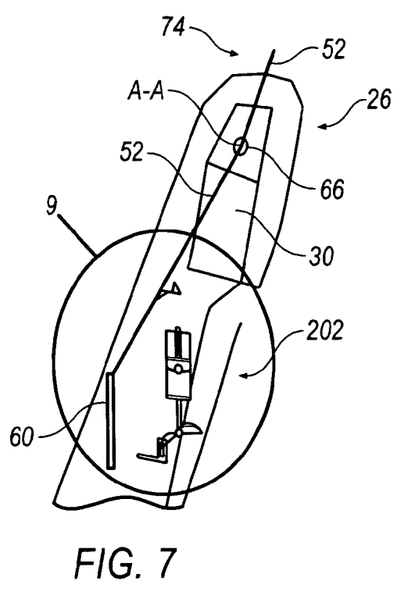
FIG. 7 is side schematic view of a lock mechanism and lock mechanism resetting device, according to an embodiment, illustrated in a first configuration.

FIGS. 4-6 illustrate another embodiment of a head restraint system as system 120. System 120 includes a seat back 122, a head restraint 124, and a head restraint control system 126. The seat back 122 includes a seat back frame 130 attached to a seat bottom (not shown), and a seat back outer covering (not shown). The seat back frame 130 includes horizontal member 140, a first vertical member 142, a second vertical member 144, a head restraint attachment portion 146, and a deceleration device attachment portion 148. The head restraint 124 includes a structural portion 150, a first link 152, a second link 154, a head restraint outer covering 156, and a guide mechanism 158.

The head restraint control system 126 includes a thorax member, or thorax back plate, 160, a first plate link 162, a second plate link 164, an interconnecting member 166 having an axis B-B, a damper, or deceleration device 168, and a latch, or lock mechanism 170. In the embodiment illustrated, the head restraint control system 126 is positioned within the seat back outer covering of the seat back 122.

The system 120 further includes a head restraint assembly 174. The head restraint assembly 174 includes the head restraint 124, the thorax plate 160, a rack and pinion device 178, and a moveable head restraint portion 180. The rack and pinion device 178 includes a pinion 182 affixed to the interconnecting member 166 and rotatable about the axis B-B, and a rack 184 meshed with the pinion 182 such that rotational movement of the pinion 182 will cause linear movement of the rack 184 generally in the direction of arrows F or R (between a rearward position of FIG. 5 and a forward position of FIG. 6). The guide mechanism 158 includes a pair of stabilizers 190 that are attached to the seat back frame 130, and a telescopic guide 192 (FIG. 6) that guides the moveable head restraint portion 180 for linear movement generally in the direction of arrows F or R. As illustrated in a comparison of FIGS. 5 and 6, the moveable head restraint portion 180 will move generally in the direction of arrows F or R relative to the seat back portion 130 as the telescopic guide 192 restrains movement of the moveable head restraint portion 180 in other directions. The moveable head restraint portion 180 includes the outer covering 156 and is attached to the rack 184 such that linear movement of the rack 184 generally in the direction of arrows F or R will result in linear movement of the head restraint portion 180 generally in the direction of arrows F or R, as best illustrated in a comparison of FIGS. 5 and 6.

As best seen in FIGS. 1-6, the head restraints 24, 124 may include a filling (not numbered) that absorbs some energy during an event where the seat occupant impacts the head restraint 24, 124. This filling may be any suitable foam, or other suitable materials that will decelerate a seat occupant's head.

FIGS. 7-10 illustrate additional components of the active head restraint control system 26. The head restraint control system 26 also includes a latch 200, and a lock mechanism resetting device 202. The latch 200 includes a latch arm 210 that extends from the thorax plate 60 to support a latching portion 212. The latching portion 212 includes a generally vertical surface 214, as discussed in greater detail below. As schematically illustrated, the latching portion 212 extends from the head restraint assembly 74. In the embodiment illustrated, the head restraint assembly 74 also includes an actuation arm 216 extending therefrom. The actuation arm 216 includes a generally vertical surface 218.

The lock mechanism resetting device 202 includes a reset cylinder 220 having an actuation piston assembly 222, a reaction piston assembly 224, an orifice membrane 226, an orifice obstruction 228, and a reaction spring 230 at least partially interposed therein. The lock mechanism resetting device 202 also includes a linear force transmitter 240 having a cam assembly 242 fixed for rotation relative to the reset cylinder 220, and a slide 246. The cam assembly 242 is fixed for rotation relative to the seat back frame 30, and the slide 246 is secured for controlled, guided movement in the forward direction F and the rearward direction R relative to the seat back frame 30. A flexible cable 248 interconnects the actuation arm 216 and the slide 246, as discussed in greater detail below.

The reset cylinder 220 is at least partially defined by a top end 250, a bottom end 252, a cylindrical inside surface 254, a top wall 256, and a bottom wall 258. The top end 250 has a top opening 260, and the bottom end 252 has a bottom opening 262 formed therein. The reset cylinder 220 may be sealed with only the top opening 260 and the bottom opening 262 providing an escape path for air. The actuation piston assembly 222 includes a generally cylindrical actuation body 270 having an actuation member 272 extending therefrom. The actuation body 270 is defined by an outer cylindrical surface 274, an actuation force surface 276, and an opposing surface 278. The reaction piston assembly 224 includes a generally cylindrical reaction body 280 having a reaction member 282 extending therefrom. The reaction body 280 is defined by an outer cylindrical surface 284, a reaction force surface 286, and an opposing surface 288.

As illustrated, the interior volume of the actuation cylinder is segregated into a top volume 290 and bottom volume 292. The top volume 290 is located between the top end 250 and the orifice membrane 226, and the bottom volume 292 is located between the bottom end 252 and the orifice membrane 226. The reset cylinder 220 is further segregated into variable volumes, such as an actuation volume 294 which is located between the actuation force surface 276 and the orifice membrane 226, and a reaction volume 296, which is located between the reaction force surface 286 and the orifice membrane 226.

The actuation member 272 is interposed through the bottom opening 262, and the reaction member 282 is interposed through the top opening 260. The orifice membrane 226 includes a slightly frusto-conical body 298, having a circular central inlet orifice 306 and at least one outlet orifice 308 formed therein. The body 298 is secured about an outer circumference CB to the inside surface 254. The reaction spring 230 is coiled around the reaction member 282 and the orifice obstruction 228 is interposed between the body 298 and the reaction piston assembly 224. As illustrated, the orifice obstruction 228 is a ball that is larger in diameter than the inlet orifice 306.

The outer cylindrical surface 274 of the actuation body 270 is sealed with the inside surface 254 of the reset cylinder 220, and the outer cylindrical surface 284 of the reaction body 280 may be sealed with the inside surface 254 of the reset cylinder 220 such that both the actuation piston assembly 222 and the reaction piston assembly 224 are readily slidable along the axis of the reset cylinder 220 and relative to the reset cylinder 220.

The cam assembly 242 rotates about a cam axis, shown at CA, and includes a cam body 340 having a cammed surface 342 and a guide rod 344 extending therefrom. The slide 246 has a slide body 348 having a slide groove 350 formed therein. The cam body 340 is positioned such that the cammed surface 342, upon rotation of the cam body 340, will contact and guide the actuation member 272 up, generally in the direction of the arrow U. The guide rod 344 is interposed within the slide groove 350 such that translation of the slide 246 generally in the direction of arrow R will rotate the cam body 340. As best seen in a comparison between FIGS. 9 and 10, when the slide 246 moves in the direction of arrow R, the cam body 340 will rotate causing the actuation piston assembly 222 to move in the direction of arrow U.

Movement of the actuation piston assembly 222 in the direction of arrow U will compress the fluid (not numbered) within the actuation volume 294. This compressed fluid will lift the orifice obstruction 228 and permit the compressed fluid to escape into the reaction volume 296. Once in the reaction volume 296, the compressed fluid will lift the reaction piston assembly 224 in the direction of arrow U, causing the reaction member 282 to extend from the top opening 260, as best seen in FIG. 10.

In operation, and assuming an event such as a rear-end collision that would accelerate the seat back 22 forward relative to a seat occupant, the kinetic energy generated by the reactive force between the relatively stationary seat occupant and the seat back 22 moving generally in the direction F, will result in a force on the thorax plate 60 generally in the direction of arrow R. This force on the thorax plate 60 will move the thorax plate 60 generally in the direction of arrow R as the head restraint assembly 74 rotates about the axis A-A to move the head restraint 24 generally in the forward direction (in the direction of arrow F) to permit the head restraint 24 to move toward the seat occupant's head.

As the thorax plate 60 moves generally in the direction of arrow R, the surface 218 of the actuation arm 216 contacts the slide 246, causing the slide 246 to move generally in the direction of arrow R. As the slide 246 moves generally in the direction of arrow R, the reaction member 282 is extended from the reset cylinder 220, as discussed above and illustrated in FIG. 10. The reaction member 282 will interfere with the surface 214 of the latching portion 212 to restrain the head restraint assembly 74 in the forward position illustrated in FIGS. 3 and 8. Thus actuated in a first actuation event, the head restraint assembly 74 will remain in the forward position until the lock mechanism 70 is unlatched.

Figure 8:
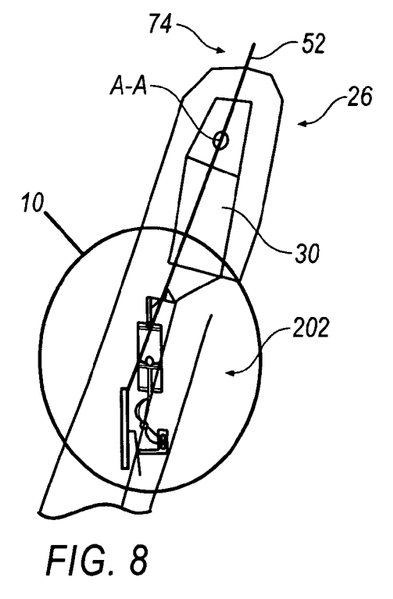
FIG. 8 is a side schematic view of the lock mechanism of FIG. 7, illustrated in a second configuration.
Figure 9:
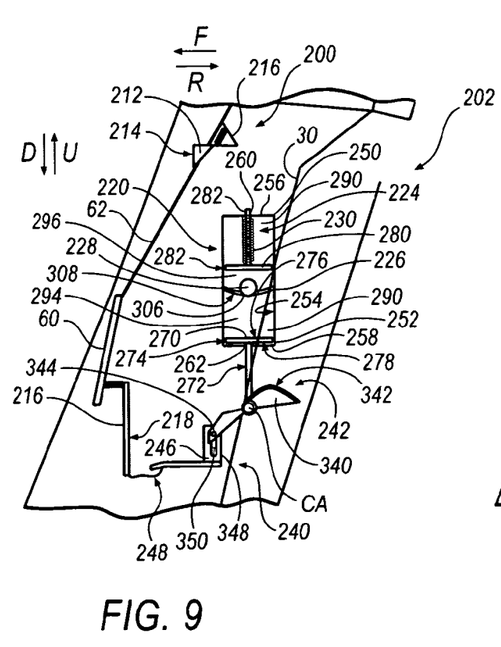
FIG. 9 is an enlarged view of portion 9 of FIG. 7.
Figure 10:
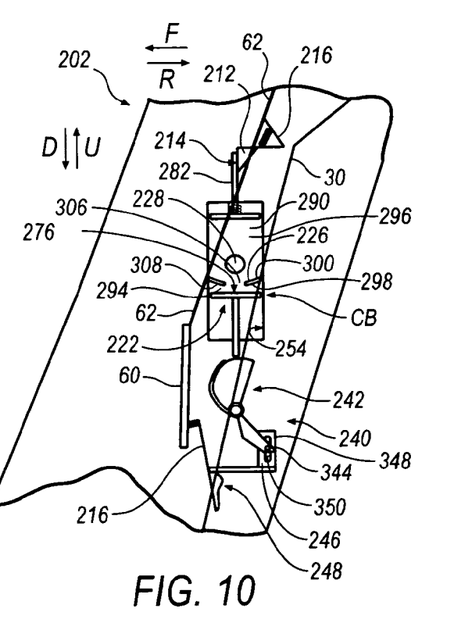
FIG. 10 is an enlarged view of portion 10 of FIG. 8.

As best seen in FIG. 10, the latch 200 engages the first plate link 62 as the thorax plate 60 moves rearwardly (in the direction of arrow R) to restrain the thorax plate 60 in a rearward, locked position and the head restraint 24 in a forward, locked position (FIGS. 8 and 10). Collectively, the latch 200 and the reaction member 282 cooperate to form the lock mechanism 70. Compressed fluid generally refers to a fluid with a pressure greater than atmospheric.

To continue discussing the operation of the head restraint control system 26, the unlatching of the lock mechanism 70 and the resetting of the head restraint control system 26 will now be presented. Once the head restraint control system 26 has actuated and the head restraint assembly 74 is latched in the forward position of FIG. 3 by the lock mechanism 70, the actuation piston assembly 222 has stopped and is no longer compressing the fluid. When the load releases on the thorax plate 60, the orifice obstruction 228 will seat with the inlet orifice 306 to seal the inlet orifice 306. The fluid contained within the reaction volume 296 will be compressed by the spring 230 exerting a force through the reaction surface 286. The compressed fluid contained within the reaction volume 296 will then be released through orifice 308, thereby permitting the reaction piston assembly 224 to move in the direction of the arrow D. As the reaction piston assembly 224 continues to move in the direction of the arrow D, the interference between the reaction member 282 and the surface 214 will cease as the reaction member 282 translates below the surface 214, thereby unlatching the head restraint assembly 74. The head restraint assembly 74 will then rotate from the forward position of FIG. 3 to the rearward position of FIG. 2.

As best seen in FIG. 10, the actuation piston assembly 222 may not be sealed tightly with the inside surface 254, thereby permitting an escape of compressed fluid therebetween to allow the reaction piston assembly 224 to move in the direction of arrow D as the fluid that escapes through orifice 308 escapes between the actuation piston assembly 222 and the inside surface 254. Also, when the head restraint assembly 74 returns to the first configuration, or rearward position of FIG. 2 from the forward position of FIG. 3, the actuation arm urges the slide 246 in the direction of the arrow F through the cable 248.

Thus reset, the head restraint assembly 74 is in the first configuration and capable of being re-actuated and reset, as described herein. That is, the head restraint system 20 will actuate in a first actuation event, automatically reset without any outside source, and actuate in a second actuation event, thereby providing a self-resetting function for the head restraint assembly 74 after being latched during the first actuation event. As illustrated, the outlet orifice 308 is sized so as to provide a controlled, predetermined amount of time for unlatching the lock mechanism 70. In the embodiment illustrated, the lock mechanism resetting device 202 will unlatch the lock mechanism 70 in a range of time between about 1.0 second to about 5 seconds. Since an actuation event may generally take place in about less than 300 milliseconds (ms), a lower desired value for the predetermined time would be greater than 300 ms.

To summarize the operation of the embodiment illustrated as system 20, a first actuation event occurs where at least one of the seat occupant and the seat back experience a change in velocity, and the seat back moves relatively toward the seat occupant. This relative movement develops a rearward force on the thorax plate 60, moving the thorax plate 60 generally in the direction of arrow R relative to the seat back frame 30. The force exerted on the head restraint assembly 74 generates an amount of kinetic energy that is transmitted to the system 20. This relative movement of the thorax plate 60 and the seat back frame 30 will cause the head restraint assembly 74 to rotate about the axis A-A as the head restraint 24 moves relative to the seat back frame 30 in the general direction of arrow F. The head restraint assembly 74 will then be restrained in the forward position by the lock mechanism 70. At least a portion of the kinetic energy, referred to as the actuation energy, is expended in rotating the head restraint assembly 74. At least a portion of the kinetic energy, referred to as the resetting energy, is expended in urging the slide 246 in the direction of the arrow R. At least a portion of the resetting energy is then mechanically transferred, or converted, to the reaction spring 230. The reaction spring 230 then urges the reaction member 282 to disengage with latching portion 212 after a finite amount of time to unlatch the lock mechanism 70.

FIGS. 11-18 illustrate alternative embodiments of the lock mechanism 70 that also may unlatch by use of a lock mechanism resetting device after a desired amount of time after actuation of a lock mechanism. These embodiments use a clockwork mechanism to effect a time delay for unlatching a lock mechanism for a head restraint system, such as systems 20, 120.

FIGS. 11-14 illustrate a lock mechanism 170. The lock mechanism 170 includes a latch 300, and a lock mechanism resetting device 302. The latch 300 includes a reset arm 310 that extends from the thorax plate 160 and a latching portion 312 that is pivotally attached to the seat back frame 130. The latching portion 312 includes a generally vertical surface 314, a latching arm 316, and a latch spring 318, as discussed in greater detail below. As schematically illustrated, the reset arm 310 extends from the head restraint assembly 174. In the embodiment illustrated, the lock mechanism resetting device 302 also includes a gear reduction device 320, a spring 322, a gear 328, a rack 330, and a cable 332. The gear reduction device 320 includes a reset actuator 334 operatively attached to the spring 322, and a time delay mechanism 336, such as is disclosed in U.S. Pat. Nos. 1,867,001; 4,062,210 and 4,359,883.

The spring 322 is compressed as the thorax plate 160 moves in the direction of the arrow R as the reset arm 310 biases at least a portion of the spring 322 in the direction of the arrow R. The cable 332 operably connects a portion of the time delay mechanism 336 with the latching portion 312 such that a portion of the time delay mechanism 336 will pull the cable 332 to unlatch the lock mechanism 170.

Figure 12:
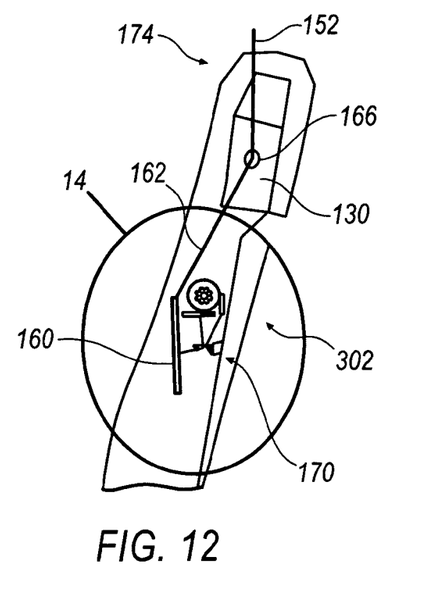
FIG. 12 is a side schematic view of the lock mechanism of FIG. 11, illustrated in a second configuration.
Figure 13:
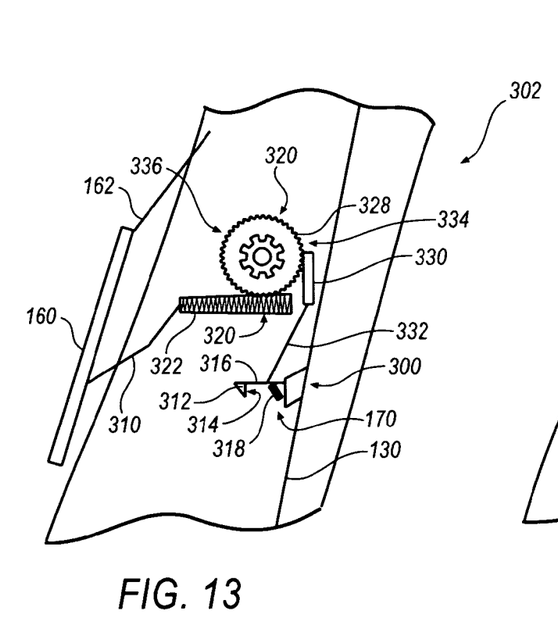
FIG. 13 is an enlarged view of portion 13 of FIG. 11.
Figure 14:
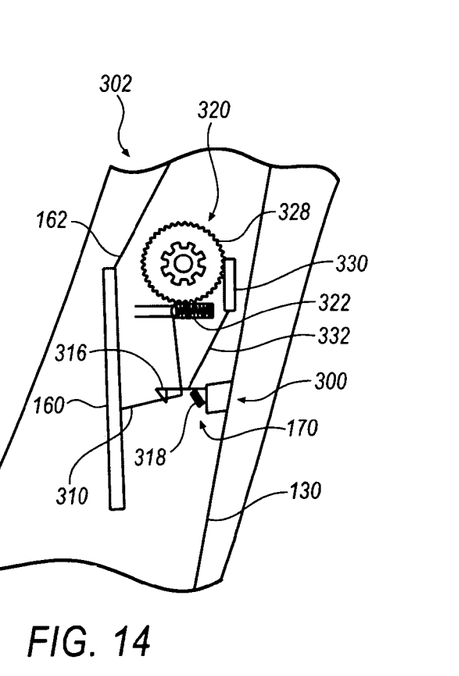
FIG. 14 is an enlarged view of portion 14 of FIG. 12.

As the thorax plate 160 and the reset arm 310 move in the direction of the arrow R, the reset arm 310 engages the latching portion 312 such that the surface 314 will interfere with the reset arm 310 to restrain the head restraint assembly 174 in the forward position as seen in FIG. 12. As illustrated, the latch spring 318 will retain the surface 314 in the interference with the reset arm 310.

Figure 11:
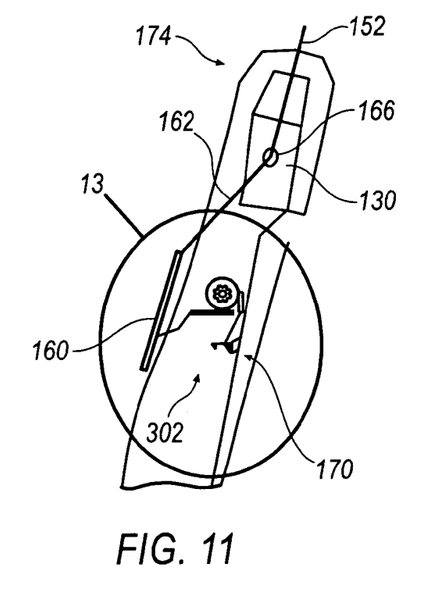
FIG. 11 is side schematic view of a lock mechanism, according to an embodiment, illustrated in a first configuration.

In the embodiment illustrated, the reset arm engages the latching portion 312 and compresses the spring 322. When the spring 322 is compressed, a reset energy is stored in spring 322. This reset energy is then used to drive the time delay mechanism 336 as the cable 332 is pulled to pull the latching portion 312 such that the surface 314 will not interfere with the reset arm, thereby unlatching the lock mechanism 170 and permitting the head restraint assembly 174 to move toward the rearward position as seen in FIG. 11. Thus configured, the lock mechanism resetting device 302 will unlatch the lock mechanism 170 after a desired amount of time preceding the actuation of the system 120.

Figure 15:
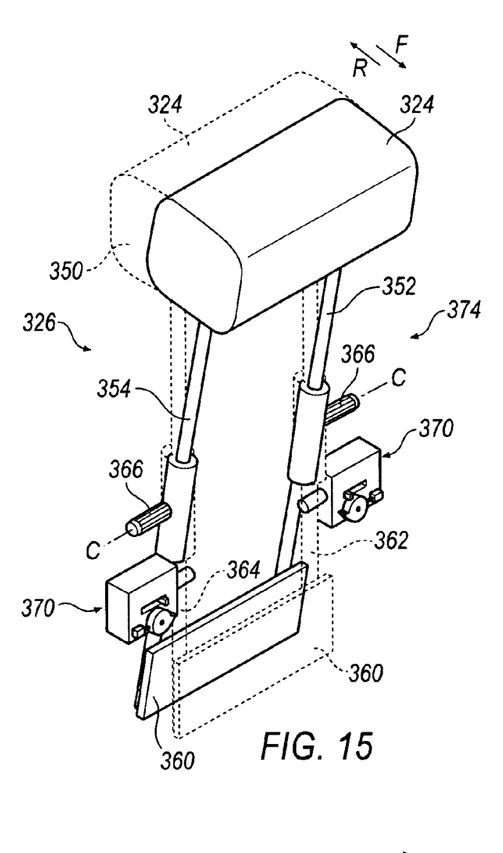
FIG. 15 is a perspective view of a head restraint system according to a further embodiment, illustrated in a first configuration.

FIGS. 15-18 illustrate a portion of a head restraint control system 326 including a lock mechanism 370 and a head restraint assembly 374. Similar to the head restraint assembly 74, the head restraint assembly 374 includes a head restraint 324, a thorax plate 360, a structural portion 350, a first link 352, a second link 354, a first plate link 362, a second plate link 364, and a pair of interconnecting members 366. The lock mechanism 370 includes a latch 400 extending from a lock mechanism resetting device 402. The interconnecting members 366 pivotally interconnect the head restraint assembly 374 to a seat back frame (not shown) thereby allowing the head restraint assembly 374 to pivot about an axis C-C from a rearward position (illustrated in phantom in FIG. 15) to a forward position (FIG. 15). In the embodiment illustrated, the interconnecting members 366 are torsional members that bias the head restraint assembly 374 in the rearward position, although other biasing devices may be used to urge the head restraint assembly 374 toward the rearward position.

Figure 16:
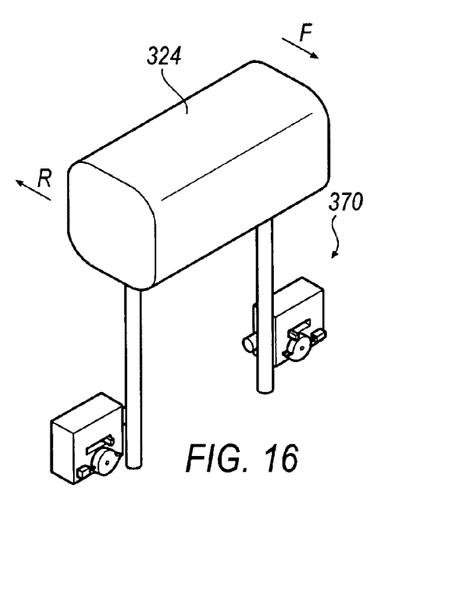
FIG. 16 is a perspective view of a head restraint system of FIG. 15, illustrated in a second configuration.

The latch 400 includes a generally planar latch end surface 420 and a generally cylindrical latch surface 422. The latch 400 extends from the lock mechanism 370 and toward the head restraint assembly 374 such that each latch end surface 420 of one lock mechanism 370 will contact one of the first plate link 362 and the second plate link 364, as best illustrated in FIG. 16.

Figure 17:
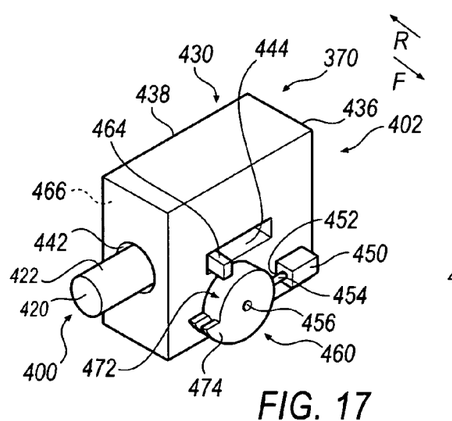
FIG. 17 is a lock mechanism according to a further embodiment.
Figure 18:
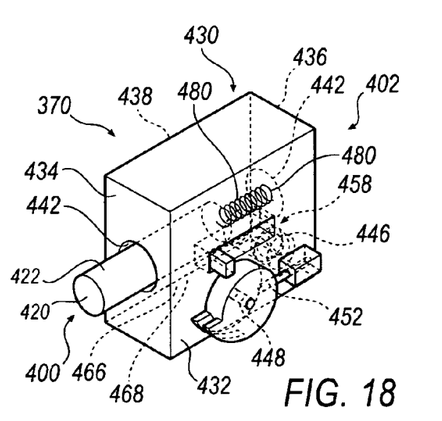
FIG. 18 is a phantom view of the mechanism of FIG. 17.

The lock mechanism resetting device 402 includes a milled reset body 430 having a front surface 432, an inboard surface 434, an outboard surface 436, and a back surface 438. The body 430 has a latch bore 442, a reset slot 444, an interference ball bore 446 formed therein, a cam biasing bore 448, and an interference block 450 extending therefrom. The latch bore 442 is a generally cylindrical bore that extends from the inboard surface 434 of the body 430 (while not intersecting the outboard surface 436) parallel to the reset slot 444 which is formed in the front surface 432 and extends from the front surface 432 to the latch bore 442. The interference ball bore 446 is a generally cylindrical bore that extends from the front surface 432 at the interference block 450 to the latch bore 442. The interference block 450 has a block bore 452 formed therein and an interference pin 454 extending therefrom. A cam pin 456 extends through the cam biasing bore 448 and is rotatable relative to the body 430.

The lock mechanism resetting device 402 also includes an interference ball 458 positioned within the interference ball bore 446, a reset cam 460 attached to a first end 462 of the cam pin 456, a reset bolt 464 attached to the latch 400 and extending through the reset slot 444, and a cam biasing mechanism 466 attached to a second end 468 of the cam pin 456. The reset cam 460 has a generally cylindrical outer surface 472 with a cam lobe 474 extending therefrom. Further, the lock mechanism resetting device 402 includes a latch spring 480 positioned within the latch bore 442 to bias the latch 400 away from the outboard surface 436. The cam biasing mechanism 466 may be a spring that is attached to the back surface 438 and wound to ensure that the reset cam 460 will rotate several revolutions, as discussed in greater detail below. The interference pin 454, when extended from the block bore 452, will interfere with the reset cam 460 to prevent rotation of the reset cam 460. When the interference pin 454 is not extended from the block bore 452, the reset cam 460 will rotate clockwise, as viewed in FIG. 18.

The interference ball 458 is moveable in the interference ball bore 446 from a forward interference position (closer to the front surface 432) to a non-interference position (closer to the back surface 438). In the interference position, the interference ball 458 will urge the interference pin 454 to extend from the block bore 452 to inhibit rotation of the reset cam 460. In the non-interference position, the interference ball 458 will permit the interference pin 454 to retract into the block bore 452 and permit the reset cam 460 to rotate.

The latch 400 is moveable in the latch bore 442 from an unlatched position (closer to the outboard surface 436) to a latched position (further from the outboard surface 436). In the unlatched position, the interference ball 458 is urged toward the interference position, and the interference ball 458 will urge the interference pin 454 to extend from the block bore 452 to inhibit rotation of the reset cam 460. In the latched position, the interference ball 458 is permitted to move to the non-interference position, where the interference ball 458 will permit the interference pin 454 to retract into the block bore 452 and permit the reset cam 460 to rotate.

As the reset cam 460 rotates in the clockwise direction, the cam lobe 474 will contact the reset bolt 464 (which is attached to the latch 400) and urge the reset bolt 464 and the latch 400 toward the outboard surface 436. Once the reset cam 460 urges the reset bolt 464 and the latch 400 into the unlatched position, the latch 400 urges the interference ball 458 into the interference position where the interference pin 454 inhibits further rotation of the reset cam 460. Also, when the latches 400 are in their respective unlatched positions (after a first actuation event), the head restraint assembly 374 will rotate toward the rearward position, thereby resetting the head restraint assembly 374 for a second actuation event.

In operation, and assuming an event such as a rear-end collision that would accelerate the seat back (not shown) forward relative to a seat occupant, the kinetic energy generated by the reactive force between the relatively stationary seat occupant and the seat back moving generally in the direction F, will result in a force on the thorax plate 360 (FIG. 15) generally in the direction of arrow R. This force on the thorax plate 360 will move the thorax plate 360 generally in the direction of arrow R as the head restraint assembly 374 rotates about the axis C-C to move the head restraint 324 generally in the forward direction (in the direction of arrow F) to permit the head restraint 324 to move toward the seat occupant's head.

As the thorax plate 360 moves generally in the direction of arrow R toward the rearward position, the first plate link 362 and the second plate link 364 will move generally in the direction of arrow R. As the first plate link 362 and the second plate link 364 move generally in the direction of arrow R, the first plate link 362 and the second plate link 364 will pass beyond contact with the latch end surfaces 420, and the latch 400 of each lock mechanism 370 will extend from the lock mechanism 370, as discussed above, thereby restraining the head restraint assembly 374 in the forward position illustrated in FIG. 15. Thus actuated in a first actuation event, the head restraint assembly 374 will remain in the forward position until the lock mechanism 370 is unlatched, also as discussed above.

As best seen in FIG. 15, each latch 400 engages one of the first plate link 362 and the second plate link 364 as the thorax plate 360 moves rearwardly (in the direction of arrow R) to restrain the thorax plate 360 in a locked position and the head restraint 324 in a forward, locked position.

In the embodiments illustrated, lock mechanisms 70, 170, 370 include a time delay resetting feature for automatic reset of the lock mechanism as the head restraint is returned to the rearward position. That is, the lock mechanisms presented herein are unlocked after a desired amount of time following an activation of the head restraint toward the forward, locked position of FIGS. 3 and 6. Also, the lock mechanisms 70, 370 have an integral lock mechanism resetting device 202, 402 that work in conjunction with the latch 200, 400, while the lock mechanism 170 has a latch 300 that may or may not operate with a lock mechanism resetting device, such as the lock mechanism resetting device 302.

Figure 19:
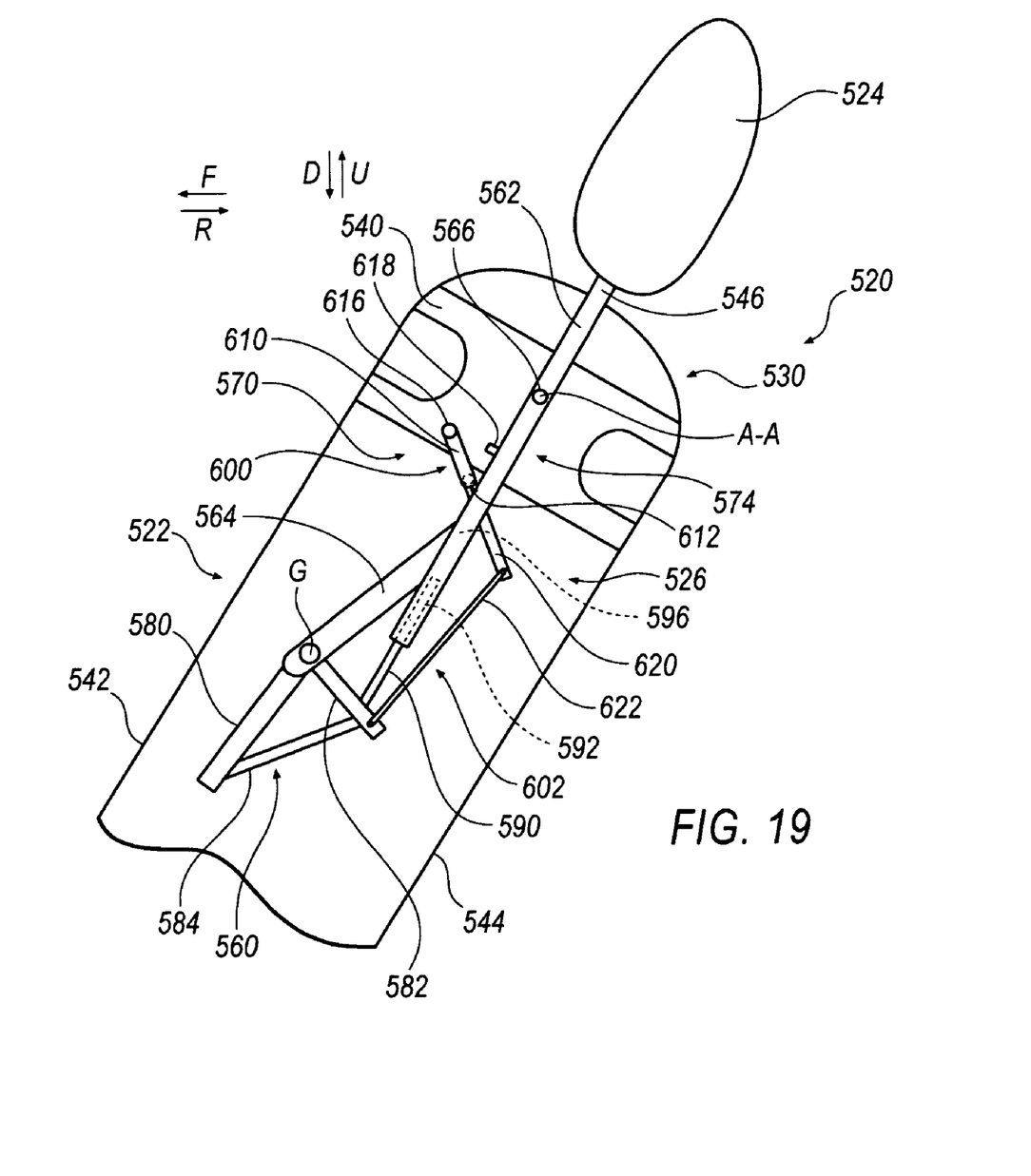
FIG. 19 is side schematic view of a lock mechanism, according to an embodiment, illustrated in a first configuration.
Figure 20:
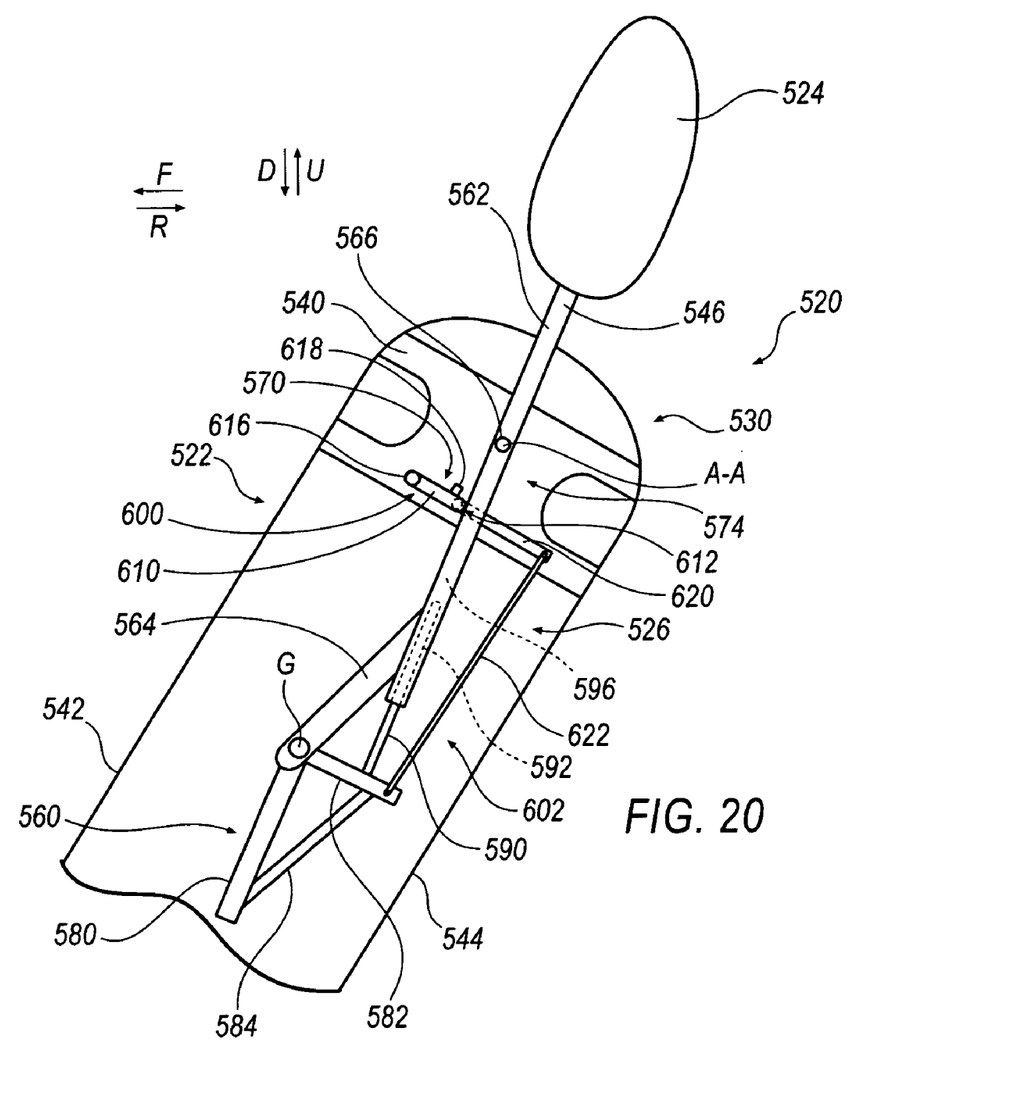
FIG. 20 is a side schematic view of the lock mechanism of FIG. 19, illustrated in a second configuration.

FIGS. 19-20 schematically illustrate yet another embodiment of an active head restraint system, as an active head restraint system 520. System 520 includes a seat back 522, a head restraint 524, and a head restraint control system 526. The seat back 522 includes a seat back frame 530 attached to a seat bottom (not shown), and a seat back outer covering (not shown). The seat back frame 530 includes an upper horizontal member 540, a first vertical member 542, a second vertical member 544, and a head restraint attachment portion 546.

The head restraint control system 526 includes a thorax member, or thorax back plate, 560, a first plate member 562, a second plate link 564, an interconnecting member 566 having an axis A-A, and a latch, or lock mechanism 570. In the embodiment illustrated, the head restraint control system 526 is positioned within the seat back outer covering of the seat back 522. The thorax back plate 560 will rotate about an axis G relative to the second plate link 564, as discussed in greater detail below.

As best seen in FIGS. 19 and 20, the first plate member 562 is rotatably attached to the horizontal member 540 generally about the axis A-A at the interconnecting member 566. The first plate member 562 is rigidly attached to the second plate link 564. The first plate member 562 supports the head restraint 524 at the head restraint attachment portion 546.

A head restraint assembly 574 is at least partially illustrated and includes the head restraint 524, the thorax plate 560, the first plate member 562, the second plate link 564, and the interconnecting member 566. The thorax plate 560 includes a first plate member 580, an actuating member 582, and may also include a bracing member 584 to retain the first plate member 580 in a desired orientation relative to the second actuating member 582.

In the embodiment illustrated, the first plate member 562 is a hollow cylindrical tube that includes a guide pin 590 at least partially interposed therein, a graphite washer 592 interposed between the guide pin 590 and the first plate member 562, and a first plate member spring 596 biasing the guide pin 592 toward the actuating member 582. The first plate member spring 596 biasing the guide pin 590 toward the actuating member 582 with a force that is sufficient to overcome the resistance to movement provided by the graphite washer 592.

Additionally, the head restraint assembly 574 may include a torsion rod that biasingly urges the head restraint assembly 574 toward the head restraint rearward position (FIG. 19), although other springs or biasing means may be interconnected between the head restraint assembly 574 and the seat back frame 530 for the same purpose.

Therefore, the head restraint assembly 574 is rotatable generally about the axis of the interconnecting member 566 from a first configuration, or rearward position, of FIG. 19 to a second configuration, or forward position, of FIG. 20. When a seat occupant is properly positioned within the seat bottom and the seat back 522, the seat occupant's head may be horizontally positioned relative to the head restraint 524, and the seat occupant's thorax may be horizontally positioned relative to the thorax plate 560.

The head restraint control system 526 also includes a latch 600, and a lock mechanism resetting device 602. The latch 600 includes a latch arm 610 that extends from the horizontal member 540 and includes a latching surface portion 612, as discussed in greater detail below. As schematically illustrated, the latch arm 610 is rotatably supported by the horizontal member 540 at a latch attachment portion 616. A latch arm stop 618 is attached to the horizontal member 540 for restricting the rotation of the latch arm 610.

In the embodiment illustrated, the interconnecting member 566 will permit the head restraint assembly 574 to rotate about the axis A-A as the first plate member 562 rotates away from the latch arm 610. As discussed in greater detail below, the latch arm 610 will rotate so as to interfere with the first plate member 562 and to restrain the head restraint assembly 574 in the forward position (FIG. 20).

The lock mechanism resetting device 602 includes the guide pin 590, the graphite washer 592, the first plate member spring 596, a latch lever 620, and a latching rod 622. The latch lever 620 is rigidly attached to the latch arm 610 so as to rotate with the latch arm 610 about the latch attachment portion 616. The latching rod 622 interconnects the latch lever 620 with the actuating member 582 to maintain a predetermined distance between a portion of the latch lever 620 with a portion of the actuating member 582.

In operation, and assuming an event such as a rear-end collision that would accelerate the seat back 522 forward relative to a seat occupant, the kinetic energy generated by the reactive force between the relatively stationary seat occupant and the seat back 522 moving generally in the direction F, will result in a force on the thorax plate 560 generally in the direction of arrow R. This force on the thorax plate 560 will move the thorax plate 560 generally in the direction of arrow R as the head restraint assembly 574 rotates about the axis A-A to move the head restraint 524 generally in the forward direction (in the direction of arrow F, from the rearward position of FIG. 20 to the forward position of FIG. 19) to permit the head restraint 524 to move toward the seat occupant's head.

As the thorax plate 560 moves generally in the direction of arrow R, the thorax plate 560 (and the actuating member 582) will rotate about the axis G, causing the actuating member 582 to move toward the first plate member 562. As the actuating member 582 moves toward the first plate member 562, the guide pin 590 is forced further into the first plate member 562 (generally in the direction of the arrow U) and the latching rod 622 is forced upward, generally in the direction of the arrow U. As the guide pin 590 is forced further into the first plate member 562, the plate member spring 596 resists the movement of the guide pin 592 and urges the guide pin 592 to move relative to the first plate member 562 generally in the direction of the arrow D. As the latching rod 622 is forced upward, generally in the direction of the arrow U, the latch arm 610 is rotated relative to the latch attachment portion 616 since the latch lever 620 will urge the latch arm to rotate.

Since the head restraint assembly 574 has rotated to the forward position of FIG. 20, the latch arm 610 may then rotate toward the position as shown in FIG. 20 until the latch arm 610 contacts the latch arm stop 618. In this position, the latching surface portion 612 will interfere with the first plate member 562 so as to retain the first plate member 562 in the forward position. Thus actuated in the forward position, the head restraint assembly 574 will not rotate toward the rearward position of FIG. 19 until the latch arm 610 rotates toward the position of FIG. 19.

With the restraint assembly 574 rotated to the forward position of FIG. 20, and the guide pin 590 forced further into the first plate member 562, the latch arm 610 may then be rotated as follows. Initially, the first plate member spring 596 will biasingly urge the guide pin 590 to retract from the first plate member 562. This action by the first plate member spring 596 will be counter acted by the frictional forces between the graphite washer 592 and the guide pin 590 and/or the first plate member 562. In the embodiment illustrated, the guide pin 590 will retract from the first plate member 562 from the position of about FIG. 20 to the position of about FIG. 19 in a few seconds (generally about 3 seconds).

As the guide pin 590 retracts from the first plate member 562, the thorax plate 560 is rotated relative to the axis G and the latching rod 622 is urged downward generally in the direction of the arrow D. As latching rod 622 is urged downward generally in the direction of the arrow D, the latch arm 610 is rotated about the latch attachment portion 616 so as to permit the head restraint assembly 574 to rotate toward the rearward position of FIG. 19. Once the head restraint assembly 574 is returned to the rearward position of FIG. 19, the system 520 is reset so as to permit the system 520 to actuate again as described herein.

While embodiments of head restraint control systems, such as the head restraint control systems 26, 126, 326, 526 and lock mechanisms, such as the lock mechanisms 70, 170, 370, 570, are presented herein in selected configurations, it would be understood that any lock mechanism and/or lock mechanism resetting device may be used with any head restraint control system embodiment as detailed herein.

Non-electrical describes to a device that does not rely on electricity for operation, such as the restraint systems 20, 120, 520 and the lock mechanism resetting device 202. More precisely, a non-electrical (or non-chemical) device, such as a resetting device for a lock mechanism would not rely on any electrical controls or outside forces other than the actuation energy to reset a lock mechanism.

In the embodiments illustrated, the systems 20, 120, 520 do not include a source of energy for actuation. That is, there is no source of energy such as a compressed spring or electrical source that is used to actuate the head restraint system 20 and cause the moveable head restraint 24 to travel forward. A mechanical conversion of energy includes converting energy from rotational motion to linear motion and vice versa, converting fluid pressure into motion, and vice versa, and storing energy in a spring or other biasing means.

A mechanical conversion of energy does not include the flow of electricity, or chemical or pyrotechnical energy. An electrical or chemical conversion of energy includes transmitting electrons to effect a flow of electricity.

For purposes of this application, it should be understood that any potential energy stored in the headrest assembly components is ignored as a source of energy that provides motion for the head restraint 24, and the kinetic energy provided by the relative movement between the thorax of a seat occupant and the thorax plate is the source of energy for actuation of the system 20. As illustrated, this kinetic energy must overcome any torsional energy required to deform the interconnecting member 66, 166, 366 if any.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An apparatus comprising:
   a seat back having an outer surface that selectively contacts a seat occupant;
   a head restraint extending from the seat back and having a head restraint portion that selectively contacts the seat occupant, wherein the head restraint portion is moveable between a forward position and a rearward position; and
   a head restraint control assembly including:
   an actuator, wherein the actuator transfers an actuation force to the head restraint portion for initiating movement of the head restraint portion from the rearward position to the forward position;
   a lock mechanism for selectively restraining the headrest portion from moving from the forward position to the rearward position; and
   a lock mechanism resetting device operably coupled to at least a portion of the lock mechanism by a first link portion, wherein the lock mechanism will restrain the headrest portion from moving from the forward position to the rearward position in a first actuation event, the lock mechanism will selectively reset by action of the lock mechanism resetting device in order to permit the headrest portion to move from the forward position to the rearward position in a second actuation event, and wherein the lock mechanism resetting device will reset the lock mechanism by converting at least a portion of the kinetic energy generated in the first actuation event into a resetting energy.

2. The apparatus of claim 1, wherein the lock mechanism resetting device is a non-electrical device.

3. The apparatus of claim 1, wherein the at least a portion of the kinetic energy is converted to the resetting energy through a mechanical conversion, without conversion into electrical or chemical energy.

4. The apparatus of claim 1, wherein the lock mechanism will selectively release the head restraint portion to permit the head restraint portion to selectively move from the forward position toward the rearward position.

5. The apparatus of claim 1, wherein the lock mechanism will selectively unlatch by action of the lock mechanism resetting device in order to permit the headrest portion to move from the forward position toward the rearward position.

6. The apparatus of claim 1, wherein the lock mechanism resetting device will selectively unlatch the lock mechanism after a time delay of at least about 300 milliseconds (ms) after the lock mechanism latches in a first actuation event.

7. The apparatus of claim 1, wherein the actuator does not include a source of energy for actuation other than the kinetic energy developed due to a resistive force between the seat occupant and the seat back.

8. The apparatus of claim 1, wherein the lock mechanism resetting device will reset the lock mechanism after a time of about 1.0 seconds (s) after the lock mechanism locks.

9. An apparatus comprising:
   a seat back having an outer surface that selectively contacts a seat occupant;
   a head restraint extending from the seat back and having a head restraint portion that selectively contacts the seat occupant, wherein the head restraint portion is moveable between a forward position and a rearward position; and
   a headrest control assembly including:
   an actuator, wherein the actuator transfers an actuation force to the head restraint portion for initiating movement of the head restraint portion from the rearward position to the forward position, wherein the actuator does not include a source of energy for actuation other than the kinetic energy developed due to a resistive force between the seat occupant and the seat back;
   a lock mechanism for selectively restraining the headrest portion from moving from the forward position to the rearward position, and
   a lock mechanism resetting device operably coupled to at least a portion of the lock mechanism by a first link portion, wherein the lock mechanism will restrain the headrest portion from moving from the forward position to the rearward position in a first actuation event and selectively unlatch by action of the lock mechanism resetting device in order to permit the headrest portion to move from the forward position toward the rearward position, wherein the lock mechanism resetting device will reset the lock mechanism after a time of about 300 milliseconds (ms) after the lock mechanism locks, without manipulation by a stored energy source.

10. The apparatus of claim 9, wherein the lock mechanism resetting device includes a spring member.

11. The apparatus of claim 10, wherein the amount of time to reset the lock mechanism is less than about 5 seconds.

12. The apparatus of claim 9, wherein the actuator is actuated by at least a portion of the kinetic energy transferred from the seat occupant to a portion of the head restraint control assembly.

13. The apparatus of claim 9, wherein the actuator does not include a trigger to initiate movement of the head restraint portion.

14. The apparatus of claim 9, wherein the actuator does not include a source of energy for actuation other than the kinetic energy developed due to a resistive force between the seat occupant and the seat back.

15. The apparatus of claim 9, wherein the lock mechanism resetting device includes an orifice for selectively permitting a fluid flow therethrough.

16. The apparatus of claim 9, wherein the lock mechanism resetting device unlatches the lock mechanism by use of a resetting energy, and the resetting energy is derived from at least a portion of a kinetic energy generated due to a resistive force between the seat occupant and the seat back.

\* \* \* \* \*